(12) United States Patent
Wang et al.

(10) Patent No.: US 6,592,700 B2
(45) Date of Patent: Jul. 15, 2003

(54) METHOD OF PRODUCING RETRO-REFLECTIVE SHEET WITH HIGH ABRASION RESISTANCE

(75) Inventors: Ching-Tang Wang, Taipei (TW); Mong-Ching Lin, Kaohsiung (TW); Chih-Chen Lin, Ping-Tong (TW); Yung-Hsiang Chou, Ping-Tong (TW)

(73) Assignee: San Fang Chemical Industry Co., Ltd., Kaohsiung Hsien (TW)

( * ) Notice: Subject to any disclaimer, the term of this patent is extended or adjusted under 35 U.S.C. 154(b) by 16 days.

(21) Appl. No.: 09/938,633

(22) Filed: Aug. 27, 2001

(65) Prior Publication Data

US 2003/0039758 A1 Feb. 27, 2003

(51) Int. Cl.$^7$ ............................................. B32B 31/00
(52) U.S. Cl. ...................... 156/235; 156/239; 156/289
(58) Field of Search ................................ 156/230, 235, 156/239, 241, 247, 249, 289

(56) References Cited

U.S. PATENT DOCUMENTS

| | | | | |
|---|---|---|---|---|
| 2,440,584 A | * | 4/1948 | Heltzer et al. | |
| 4,104,102 A | * | 8/1978 | Eagon et al. | |
| 4,605,461 A | * | 8/1986 | Ogi | 156/239 X |
| 4,664,966 A | * | 5/1987 | Bailey et al. | |
| 5,631,064 A | * | 5/1997 | Marecki | |
| 5,916,399 A | * | 6/1999 | Olsen | 156/230 |
| 6,059,915 A | * | 5/2000 | Lightle et al. | 156/241 X |
| 6,416,856 B1 | * | 7/2002 | Crandall | |
| 6,440,334 B2 | * | 8/2002 | Currens et al. | 156/235 X |
| 2002/0071183 A1 | * | 6/2002 | Mullen et al. | |

FOREIGN PATENT DOCUMENTS

| | | | |
|---|---|---|---|
| EP | 0 082 618 | * | 6/1983 |
| JP | 10-193887 | * | 7/1998 |

* cited by examiner

Primary Examiner—Curtis Mayes
(74) Attorney, Agent, or Firm—Bacon & Thomas

(57) ABSTRACT

The present invention relates to a method for preparing retro-reflective sheet with high abrasion resistance produced by initially coating the first coating layer one component type polyurethane (hereinafter refer to PU) resin mixed with reflective particles on the pattern releasing paper with embossed grain, and after drying, further coating the second layer two component type PU resin adhesive agent containing colorant, then drying; above this, coating a kind of paste; finally, adhering substrate; after pre-drying and curing, divesting releasing paper, using solvent to solve the part of PU resin leaving reflective particles exposed and hardened. The material produced characterized in high abrasion resistance and using soft material as substrate. Use of the retro-reflective material produced by the invention is valuable for commercial fields like coat, vest, shoes, cap, poster, and the like.

15 Claims, No Drawings

METHOD OF PRODUCING RETRO-REFLECTIVE SHEET WITH HIGH ABRASION RESISTANCE

BACKGROUND OF THE INVENTION

1 Field of the Invention

The present invention relates to a method for preparing retro-reflective sheet with high abrasion resistance which is especially formed according to the following process: on the pattern releasing paper, the first coating layer one component PU resin mixed with reflective particles is coated initially; after drying, the second coating layer two component PU adhesive agent is coated; after being dried, a kind of paste is coated on it; finally, substrate is adhered. After drying and curing, pattern paper is divested from the resin, while solvent is used to solve part of the PU resin, leaving reflective particles exposed and hardened, forming final product. The material produced characterized in high abrasion resistance and using soft material as substrate. In accordance with the invention, the material is well suited to commercial uses like coat, vest, shoes, cap, poster, and the like.

2. Description of the Prior Art

Many patents have been disclosed for composition of retro-reflective material layer and the producing method thereof in U.S. Pat. Nos. 2,432,928, 2,440,584, 2,543,800, 2,397,702, 4,104,102, and the like, wherein retro-reflective plate containing one layer of glass beads is mentioned. Various retro-reflective layer invented in these U.S. Patents serve various commercial and industrial fields, such as mark of highway, traffic retro-reflective plate, and the like, which posses the property of reflecting the ray incident to the main part of the sign, and ray reflected will actually go along the original route, returning to source of the ray. Viewing from the aspect of applying the laminate structure of the retro-reflective plate, it's important to have excellent optical transparence, which make the rays be reflected efficiently when rays entering into the laminate structure with a relative small angle. So a flexible layer structure will benefit the print and printing ink to deposit, and benefit each laminate to bond closely within the layer structure, presenting the feature of weather resistance and glass beads being fixed firmly on the laminate structure.

OBJECTS OF THE INVENTION

Most commercially available retro-reflective materials have good retro-reflective effect, but fail to be abrasion resistive, and glass beads contained in the retro-reflective materials frequently divest off after couple of rubbing. The reason is that before the substrate is hardened, the glass beads just spreads on the resin, being fixed on it physically. After hardening, the fixation is not so strong between the resin and the glass beads that the retro-reflective materials fail to be abrasion resistive. Additionally, hardened resin simply arranges in plain style, not perfect for retro-reflective performance. In present market, the retro-reflective material is limited to serving as highway mark, traffic retro-reflective plate and industrial safety sign for the reason that the substrate is made from hard material. Never see any retro-reflective materials suitable for any commercial fields like coat, vest, shoes, cap, poster made from soft substrate in the market.

SUMMARY OF THE INVENTION

For these reasons, after dedicating study and research, the invention presents a process as following: initially coating the first coating layer one component type polyurethane (PU) resin mixed with glass beads on the releasing paper with embossed grain; after drying, further coating the second coating layer two component type PU resin containing colorant, then drying it; above this layer, coating a kind of paste; finally, adhering the substrate; after pre-drying and curing, divesting releasing paper from the layer structure; finally, using solvent to solve the divested layer structure, leaving glass beads exposed and hardened, forming a retro-reflective material with glass beads being firmly fixed and characterized in abrasion resistance.

DETAILED DESCRIPTION OF THE PREFERRED EMBODIMENT

The following is a detailed description of the invention.

The primary technical characteristics of the invention is using the first coating layer one component type PU resin in appropriate weight as the matrix resin of the retro-reflective material. It's necessary for the resin to apply a balance structure to exhibit excellent resistance to abrasion, heat adhesion and corrosion. The first coating layer should apply one component type PU having an excellent resistance to heat, to benefit subsequently drying and curing which are useful for heat-resistance. Generally, the key of increasing heat resistance of the PU resin is to enhance the cohesive strength, for example, to increase the content of hard segment.

Although PU resin with increased content of hard segment has fine heat-resistant performance, some problems still exits, for example, during processing of the releasing paper and the second coating two component type PU resin, especially when lamination process (referring to the process of coating the second layer on the first layer) is carried out in a short heating period and under incomplete drying, full heat-resistant performance has not be imparted to various layer.

To eliminate the history problem of not fully imparting heat-resistant performance, one object of present invention is to provide a kind of one component type PU resin as the first coating layer, instead of using cross-linking agent, therefore when lamination process is carried out under incomplete drying, one component type PU resin with heat-resistant performance can be obtained.

PU resin used in one component PU resin of present invention comprises polyol component, poly isocyanate component and organic solvent.

Examples of preferred polyol component are polyester polyol and polyether polyol. The former can be produced in addition reaction by reacting ethylene oxide and/or propylene oxide with small molecular weight polyol such as glycol, diethylene glycol, triethylene glycol, 1,2-propylene glycol, 1,3-propylene glycol, 1,2 butylene glycol, 1,3-butylene glycol, 1,4-butylene glycol, hexamethylene glycol, hydrogenated bisphenol A, bisphenol A, trihydroxy methyl propane, glycerin or polyethylene glycol, polypropylene glycol, polyethylene/polypropylene glycol, poly caprolactone polyol, poly alkene polyol, polybutadiene polyol. The latter can be produced by reacting polyol with polybasic carboxylic acid. Suitable polybasic carboxylic acid can be aliphatic, alicyclic, aromatic or heterocyclic, preferably substituted by halogen atom and/or unsaturated polyester. Preferred polyester polyol includes glycol, 1,2-propylene glycol, 1,3-propylene glycol, 1,3-butylene glycol, 1,4-butylene glycol, 2-β-hydroxybutylene glycol, 1,6-hexamethylene glycol, 1,7-heptamethylene glycol, 1,8-octylene glycol, 1,12-dodecane glycol, 1,18-octadecane glycol, neopentyl glycol, hexamethylene glycol, bis(1,4-hydroxy methyl) cyclohexane, 2,2-bis(4-hydroxy cyclohexyl) propane, 2,2-(bis-β-hydroxy ethoxy) phenyl propane, 2-methyl-1,3-butyleneglycol,3-methyl-1,5-pentamethylene glycol, 2,2,4-trimethyl-1,6-hexamethylene glycol,2,4,4-trimethyl-1,6-hexamethylene glycol, glycerin, 1,1,1-trihydroxy methyl ethane, 1,2,6-hexane triol, 1,2,4-butatriol, tris-(p-hydroxyethyl) trimeric isocyanate, isoamyl tetra-alcohol, mannitol, sorbitol, diethylene glycol, dipropylene glycol, bibutylene glycol, xylyl glycol and hydroxy valeric neopentyl glycol ester. Abovementioned polybasic carboxylic acid can be succinellite, hexane diacid, 1,8-octanedioic acid, nonanedioic acid, decanedioic acid, phthalic acid, p-phthatic acid, m-phthatic acid, trimesic acid, pyromellitic acid, tetrahydric phthalic acid, hexahydric phthalic acid, hexahydric terephthatic acid, dichloro phthalic acid, tetrachloro phthalic acid, methylene bridge tetrahydric phthalic acid, dibasic fatty acid, pentanedioic acid, maleic acid, fumaric acid and anhydride thereof, dimethy p-phthatiate ester, p-phthatic acid bidiol ester. During preparation of polyester polyol, use any mixture of abovementioned polyol mixing with any mixture of abovementioned poly dicarboxylic acid and/or anhydride or ester thereof. Preferred ratio of polyester polyol with molecular weight from 1,000 to 5,000, preferably from 1,500 to 3,000, and polyether polyol with molecular weight from 1,000 to 5,000, preferably from 2,000 to 3,000 in all amount of polyol component is from 1/9 to 9/1 by weight, preferably from 3/7 to 7/3 which can produce coating material with excellent resistance to abrasion and heat. The abovementioned polyester polyol and polyether polyol may be used alone or in combinations of two or more. But the ratio of polyol in all amount of mono liquid PU resin is from 15% to 20% by weight.

Examples of preferred poly isocyanate component are poly aliphthalic isocyanate, alicyclic isocyanate and aromatic isocyanate. Preferred aromatic isocyanate comprises: tolylene diisocyanate (TDI), diphenyl methane diisocyanate (MDI), xylene diisocyanate (XDI), 3,3'-dimethoxy-4,4'-biphenyl diisocyanate, 1,5-naphthalene diisocyanate, 1,5-tetrahydronaphathalene diisocyanate, 2,4-methylene phenyl diisocyanate, 2,6-methylene phenyl diisocyanate, 4,4-diphenyl methane diisocyanate, 2,4-diphenyl methane diisocyanate, phenylene diisocyanate, xylenyl diisocyanate and tetramethyl xylenyl diisocyanate. Preferred acyclic isocyanate comprises: tetramethane diisocyanate (TMDI), hexylmethane diisocyanate (HMDI), cyclohexyl diisocyanate, 4,4-bicylcohexyl methane diisocyanate, 2,4-bihexyl methane diisocyanate. Preferred alicyclic isocyanate comprises isophorone diisocyanate (IPDI). Using diphenyl methane diisocyanate (MDI) and isophorone diisocyanate (IPDI) can induce coating layer with excellent resistance to abrasion and heat. The abovementioned poly isocyanate may be used alone or in combinations of two or more. The application amount of poly isocyanate to one component PU resin is from 5% to 10% by weight.

Examples of preferred organic solvent are acetone, methyl ethyl ketone, methyl benzene, xylene, dioxane, tetrahydro furan, N-methyl-2-pyrrolidone, dimethyl formaldehyde, dimethyl acetoaldehyde, dimethyl sulfoxide and ethyl acetate, preferably dimethyl formaldehyde, dimethyl acetoaldehyde and dimethyl sulfoxide. The ratio of organic solvent in total amount of one component type PU resin is from 70% to 80% by weight.

One component type PU resin used in present invention consists of PU resin produced by polyol reacting with poly isocyanate in organic solvent, solvent, reflective particles and additives. In order to make the interlayer structure comprising the first coating layer one component type PU resin, the releasing paper and the second coating layer two component type PU resin containing colorant, has heat-resistant performance, joint use of various additives in the formulation of the first coating layer one component PU resin is certainly permitted.

Preferred particle diameter of abovementioned reflective particles, example of glass beads is not less than 100 μm, which is in favor of preventing from distortion of shaped product and enhance intensity and heat-resistance of first coating layer one component type PU resin. Surface of glass beads used violently reacts with commonly used silane type coupling agent and is well absorbed to the resin. Preferred particle diameter of the glass beads is in the range between 10 and 100 μm. Considering the heat-resistant adhesive performance of the layer structure consisted by the first coating layer one component type PU resin and the second coating layer two component type PU resin, abrasion resistance performance of the retro-reflective material, and enhancement of reflection, the ratio of glass beads in total amount of the first layer one component type PU resin is from about 1:4 to about 4:1 by weight, preferably 3:1.

Examples of preferred additives are tackifying agent such as rosin latex, terpene latex, petroleum resin latex; filling agent such as graphite, clay, talcum powder, silicon dioxide, mica, calcium carbonate, aluminium hydroxide; additives such as silicon dioxide sol, alumina sol; film forming auxiliaries such as alkylene glycol; silane coupling agent; surfactant; levelling agent; antioxidant additive; antifoaming additive; viscosity reducing agent; plasticizers; pigment and dyestuff; flame retardant; lubricant, and the like.

Generally, even without crosslinking agent in the first coating layer one component PU resin presented by the invention, the first coating layer one component PU resin also has excellent heat-resistant performance. Only when other performance like weather resistance and moisture-heat resistance is needed to introduce, crosslinking agent. Preferred crosslinking agent includes epoxy resin, isocyanate, ethylene imine, carbodiimide, and the like.

In present invention, for the releasing paper, coated with the first coating layer one component type PU resin mixed with reflective particles, it can be made from PVC, PE, PP, cellulosic pulp or compound thereof. Surface style is preferably embossed grain or plane grain. There's no specific limitation for the coating means of the first coating layer one component type PU resin, just usual method like knife coating, roll coating, bar coating, curtain coating, spray coating, squeez coating, and the like. Considering subsequent process and use of retro-reflective material, coating depth should be between 30 and 250 μm, preferably 60 and 200 μm. When necessary, coating can be carried out in one time or several times.

The first coating layer one component type PU resin mixed with reflective particles is dried. Temperature and time of drying are not particularly limited, just being set to vaporize the solvent included in the first coating layer one component type PU resin. Then the first coating layer one component type PU resin is dried to tack free, to benefit heat bonding of the second coating layer two component type PU resin containing colorant.

Furthermore, on the coated the first coating layer one component type PU resin, coating process of the second coating layer two component type PU resin containing colorant is carried out. Two component type PU resin used in the second coating layer two component type PU resin containing colorant, normally comprises polyol component and isocyanate component.

Polyol component presented in the second coating layer two component type PU resin in the invention, preferably comprises mixture of polyester polyol and polyether polyol, dominatingly neopentyl glycol. Polyol in the polyol component, is used to benefit an excellent adhesive strength and mechanical strength for the second coating layer two component type PU resin containing colorant and paste subsequently coated on it, wherein the amount of neopentyl glycol used to total polyol component is about from 40 to 80% by weight. In addition, the polyol component used here can still include the one applied in the first coating layer one component type PU resin. Combining this typical polyol component dominatingly consisted by neopentyl glycol with solvent mixture is helpful to the second coating layer two component type PU resin containing colorant and paste subsequently coated on it in the aspect of excellent bonding intensity and mechanical strength. Inclusion of vibration-to-influence resin and flowing additive is applicable. Solvent mixture used herein refers to ethyl acetate, butyl acetate, propylene glycol monomethyl ether ethyl ester, benzene or xylene, with any proportion in the mixture.

Preferred isocyanate component is mixture of prepolymer of poly isocyanate, typically including poly acyclic isocyanate, alicyclic isocyanate and aromatic isocyanate. Preferred aromatic isocyanate comprises toylene diisocyanate (TDI), diphenyl methane diisocyanate (MDI), xylene diisocyanate (XDI), 3,3'-dimethoxy-4,4'-biphenyl diisocyanate, 1,5-naphthalene diisocyanate, 1,5-tetrahydronaphathalene diisocyanate, 2,4-methylene phenyl diisocyanate, 2,6-methylene phenyl diisocyanate, 4,4'-diphenyl methane diisocyanate, 2,4'-diphenyl methane diisocyanate, phenylene diisocyanate, xylenyl diisocyanate and tetramethyl xylenyl diisocyanate. Preferred acyclic isocyanate comprises: tetramethane diisocyanate (TMDI), hexylmethane diisocyanate (HMDI), cyclohexyl diisocyanate, 4,4-bicylcohexyl methane diisocyanate, 2,4-bihexyl methane diisocyanate. Preferred alicyclic isocyanate comprises: isophorone diisocyanate (IPDI). Particularly preferred diphenyl methane diisocyanate (MDI) and isophorone diisocyanate (IPDI) induces coating layer with excellent wearproof and heat-resistant performance. Either use above-mentioned three kinds of isocyanate separately or jointly. Preferably use solvent mixture together with the isocyanate componet. Just like above, solvent mixture used herein refers to ethyl acetate, butyl acetate, propylene glycol monomethyl ether ethyl ester, benzene or xylene, with any proportion in the mixture.

As to colorant used in the second coating layer two component type PU resin in the present invention, no specific limitation to it, just mixture of inorganic pigment, comprising natural mineral and synthetic pigment and organic pigment, comprising lake color and insoluble colorant. Color of the second coating layer two component type PU resin exhibits through reflection of reflective particles in transparent the first coating layer one component type PU resin.

Still, the coated the second coating layer two component type PU resin is dried to tack free. Like above, temperature and time of drying are not particularly limited, just being set to vaporize the solvent included in the second coating layer two component type PU resin. The second coating layer two component type PU resin is dried to tack free, for the convenience of heat bonding of subsequent paste on it.

Finally, substrate is glued by paste. After pre-drying and curing, releasing paper is divested. Solvent is used to solve the first coating layer one component type PU resin, leaving reflective particles exposed and hardened, to get a retro-reflective material characterized in abrasion performance. Used paste is normal adhesive used by substrate. Examples of preferred substrate in present invention are PVC, nylon, polyester, ABS, polyurethane, PE, PP, TPO (olefin substrate), cellulosic product, nature leather, synthetic product, Al (aluminum), Cu (copper), Fe (iron), stainless steel, paper, timber, MDF board, man-made board, glass. Preferably, paper, nature leather, cellulosic product and synthetic product are used in commercial fields like coat, vest, shoes, cap, poster. Substrate is glued on the paste. After pre-drying and curing, releasing paper is divested. Solvent is used to solve the first coating layer one component type PU resin, leaving reflective particles exposed and hardened, to get a retro-reflective material characterized in high abrasion resistance performance. Temperature range of drying and curing are not particularly limited, depending on the necessary of applied paste and the second coating layer two component type PU resin. Examples of preferred solvents used to solve the first coating layer one component type PU resin are acetone, methyl ethyl ketone, methyl benzene, xylene, dioxane, tetrahydro furan, N-methyl-2-pyrrolidone, dimethyl formaldehyde, dimethyl acetoaldehyde, dimethyl sulfoxide and ethyl acetate, preferably dimethyl formaldehyde, dimethyl acetoaldehyde and dimethyl sulfoxide. The abovementioned solvent may be used alone or in combinations of two or more.

Adding one or two layer of transparent membrane for print protection on the highly abrasion resistance retro-reflective material produced by above described process can enhance surface reflection effect and protect the surface. After carrying out the process of drying, curing and divesting of the releasing paper, roller with embossd grain can be used to roll and press the retro-reflective material so that surface grain pattern is exhibited. Finally hardening process is carried out.

Retro-reflective performance of the highly abrasion resistance retro-reflective material produced by above described process is tested according to Test Method for Retro-reflective Plate and Retro-reflective Tape stipulated in Item 3.2 of Retro-reflective Performance Test Method in CNS 4346. Abrasion resistance performance of that is tested according to the Taber Method stipulated in ASTM D3884 on a Taber abrasion test machine (Model 5130, made by US Taber Industries Company). During test, put on 1 kg of load on the retro-reflective material produced in the present invention, then rotate it with a 150 mesh H22 grinding wheel by 1000 rotation. After that, the tested material is assessed.

Process of the present invention will be described below in detail by referring examples. However, the present invention is not limited to the thereto.

EXAMPLE 1

Glass beads with particle diameter of 10–40 $\mu$m (commercially obtained from Taiwan Merck and Yishin Ltd., Co.) is added into the one component type PU resin (commercially obtained from Yongjie and Taijing Ltd., Co., wherein molecular weight of polyester polyol is from 1,500 to 3,000, molecular weight of polyether polyol is from 2,000 to 3,000, the ratio of polyester polyol and polyether polyol in total amount of polyol component is from 3/7 to 7/3 by weight, in total amount of one component type PU resin is from 15% to 20% by weight; while isocyanate component is mixture of MDI and IPDI, taking up from 5% to 10% in total amount of one component PU resin; the remaining part, from 70% to 80% of one component type PU resin is mixture obtained from reacting DMF and toluene.) in the proportion of 3:1 by weight. The mixture is coated on the pattern paper with embossed grain (commercially obtained from Asahi Roll Ltd., Co., of Japan and American Warren Company), in the manner of knife coating. Then the mixture is dried in an oven at 100° C. until the depth equals to 100 μm. Further, another layer of one component PU resin is coated on the dried mono liquid PU resin and dried again. Next the second coating layer two component type PU resin containing colorant is coated and dried. Then paste is coated, and substrate of polyester cellulose is glued, after drying and curing, the releasing paper is divested. DMF solvent is used to solve the first coating layer one component type PU resin mixed with glass beads, releasing paper being divested partially, leaving glass beads exposed. After being hardened at 150° C., retro-reflective material is produced.

A test is carried out on a Taber abrasion test machine (Model 5130, made by US Taber Industries Company) for the retro-reflective material produced in the present invention. 1 kg of load is put on the retro-reflective material, then rotated with a 150 mesh H22 grinding wheel by 1000 rotation. After that, assessment is made, finding that after 1000 rotation, there's no divestment of glass beads, in contrast, finding that after 10 rotation, there's some divestment of glass beads in the retro-reflective sheet commercially available.

Advantageous Effect of the Invention

Retro-reflective material produced according to the present invention can be used in commercial fields like coat, vest, shoes, cap, poster, due to the advantage of using soft cellulose as substrate.

What is claimed is:

1. A method of producing a retro-reflective sheet with high abrasion resistance comprising the steps of:
    coating a first coating layer, of one component type polyurethane resin mixed with reflective particles, on a pattern releasing paper having embossed grain;
    drying the first coating layer;
    coating a second coating layer, of two component polyurethane resin interface agent containing colorant, on the first coating layer;
    drying the second coating layer;
    coating an adhesive paste on the second coating layer;
    placing a substrate on the adhesive paste;
    drying and curing the adhesive paste;
    removing the pattern releasing paper, leaving the first coating layer and second coating layer on the substrate;
    using solvent to dissolve the one component type polyurethane resin of the first coating layer, leaving reflective particles exposed; and
    hardening the polyurethane resin, forming the retro-reflective sheet with high abrasion resistance.

2. The method of producing retro-reflective sheet with high abrasion resistance as recited in claim 1, wherein the material of said pattern releasing paper is PVC, PB, PP, cellulose paper pulp or compound thereof, with surface style of embossed grain.

3. The method of producing retro-reflective sheet with high abrasion resistance as recited in claim 1, wherein said reflective particles, in the first coating layer one component type PU resin mixed with reflective particles, is present with particle diameter between 10 and 100 μm, and in amounts such that ratio of reflective particles to the first coating layer one component type PU resin is from about 1:4 to about 4:1 by weight.

4. The method of producing retro-reflective sheet with high abrasion resistance as recited in claim 1, wherein said PU resin in the first coating layer one component type PU resin mixed with reflective particles, comprises polyol component, poly isocyanate component and organic solvent.

5. The method of producing retro-reflective sheet with high abrasion resistance as recited in claim 4, wherein said polyol component comprises polyester polyol, with molecular weight from 1,000 to 5,000, and polyether polyol with molecular weight from 1,000 to 5,000; while the ratio of said polyester polyol and polyether polyol in all amount of said polyol component is from 1/9 to 9/1 by weight.

6. The method of claim 5 wherein said polyester polyol has a molecular weight from 1500 to 3000.

7. The method of claim 6 wherein said polyether polyol has a molecular weight from 2000 to 3000.

8. The method of claim 7 wherein said ratio is from 3/7 to 7/3 by weight.

9. The method of producing retro-reflective sheet with high abrasion resistance as recited in claim 4, wherein said poly isocyanate component is aromatic isocyanate and/or alicyclic isocyanate comprising isophorone diisocyanate (IPDI); the ratio of said poly isocyanate component in total amount of one component type PU resin is from 5% to 10% by weight.

10. The method of claim 9 wherein said aromatic isocyanate is on of more aromatic isocyanates selected from the group consisting of tolune diisocyanate (TDI), diphenyl methane diisocyanate (MDI), xylene diisocyanate (XDI), 3,3'-dimethoxy-4,4'-biphenyl dilsocyanate, 1,5-naphthalene diisocyanate, 1,5-tetrahydronaplithalene diisocyanate, 2,4 methylene phenyl diisocyanate, 2,6-methylene phenyl diisocyanate, 4,4 diphenyl methane diisocyanate, 2,4-diphenyl methane diisocyanate, phenylene diisocyanate, xylenyl diisocyanate and tetramethyl xylenyl diisocyanate.

11. The method of producing retro-reflective sheet with high abrasion resistance as recited in claim 4, wherein said organic solvent is one or more organic solvents selected from the group consisting of acetone, methyl ethyl ketone, methyl benzene, xylene, dioxane, tetrahydrofuran, N-methyl-2-pyrrolidone, dimethyl formaldehyde, dimethyl acetoaldehyde, dimethyl sulfoxide and ethyl acetate; the ratio of said poly isocyanate component in total amount of one component type PU resin is from 70% to 80% by weight.

12. The method of producing retro-reflective sheet with high abrasion resistance as recited in claim 1, wherein said substrate refers to PVC, nylon, polyester, ABS, polyurethane, PE, PP, IPO, cellulose product, nature leather, synthetic product, Al (aluminum), Cu (copper), Fe (iron), stainless steel, paper, timber, MDF board, man-made board, and glass.

13. The method of claim 12 wherein said substrate is selected from the group consisting of paper, cellulosic product and synthetic product.

14. The method of producing retro-reflective sheet with high abrasion resistance as recited in claim 1, wherein said solvent used to dissolve the first coating layer is one or more organic solvents selected from the group consisting of acetone, methyl ethyl ketone, methyl benzene, xylene, dioxane, tetrahydrofuran, N-methyl-2-pyrrolidone, dimethyl formaldehyde, dimethyl acetoaldehyde, dimethyl sulfoxide and ethyl acetate, preferably dimethyl formaldehyde, dimethyl acetoaldehyde and dimethyl sulfoxide.

15. The method of producing retro-reflective sheet with high abrasion resistance as recited in claim 1, wherein one or two layer of transparent membrane for print protection on the surface is added to enhance surface reflection effect and to protect the surface.

* * * * *